United States Patent [19]

Torghele

[11] 3,933,554

[45] Jan. 20, 1976

[54] PROCESS FOR MANUFACTURING FLEXIBLE HOSES OF ELASTOMERIC MATERIAL HAVING A CAVITY WALL

[75] Inventor: Flavio Torghele, Milan, Italy

[73] Assignee: Treg S.p.A., Veniano, Italy

[22] Filed: June 13, 1974

[21] Appl. No.: 479,166

[30] Foreign Application Priority Data
June 13, 1973 Italy .................................. 25297/73

[52] U.S. Cl. ................ 156/143; 138/134; 138/138; 156/155; 156/156; 156/190; 156/195
[51] Int. Cl.².... B31C 13/00; B65H 81/00; F16L 11/12
[58] Field of Search .......... 156/143, 144, 155, 190, 156/191, 195, 156; 138/119, 127, 133, 134, 137, 138, 154

[56] References Cited
UNITED STATES PATENTS

| | | |
|---|---|---|
| 2,755,216 | 7/1956 | Lemons ............................. 156/155 |
| 3,762,982 | 10/1973 | Whittington ........................ 156/190 |
| 3,766,949 | 10/1973 | Champleboux et al. ............ 138/133 |
| 3,821,050 | 6/1974 | Ambrose et al. ................... 156/143 |

Primary Examiner—Douglas J. Drummond
Assistant Examiner—Basil J. Lewis
Attorney, Agent, or Firm—Stevens, Davis, Miller & Mosher

[57] ABSTRACT

In the described process for the manufacture of reinforced hoses of elastomeric material having a hollow space in their wall, said hollow space is formed by means of a structural shape helically positioned between the two assemblies of layers which constitute in their whole the wall of the hose, and during curing the hollow space is filled with a material inert to curing, which is discharged in liquid state from the hollow space after curing.

4 Claims, 1 Drawing Figure

U.S. Patent   Jan. 20, 1976   3,933,554
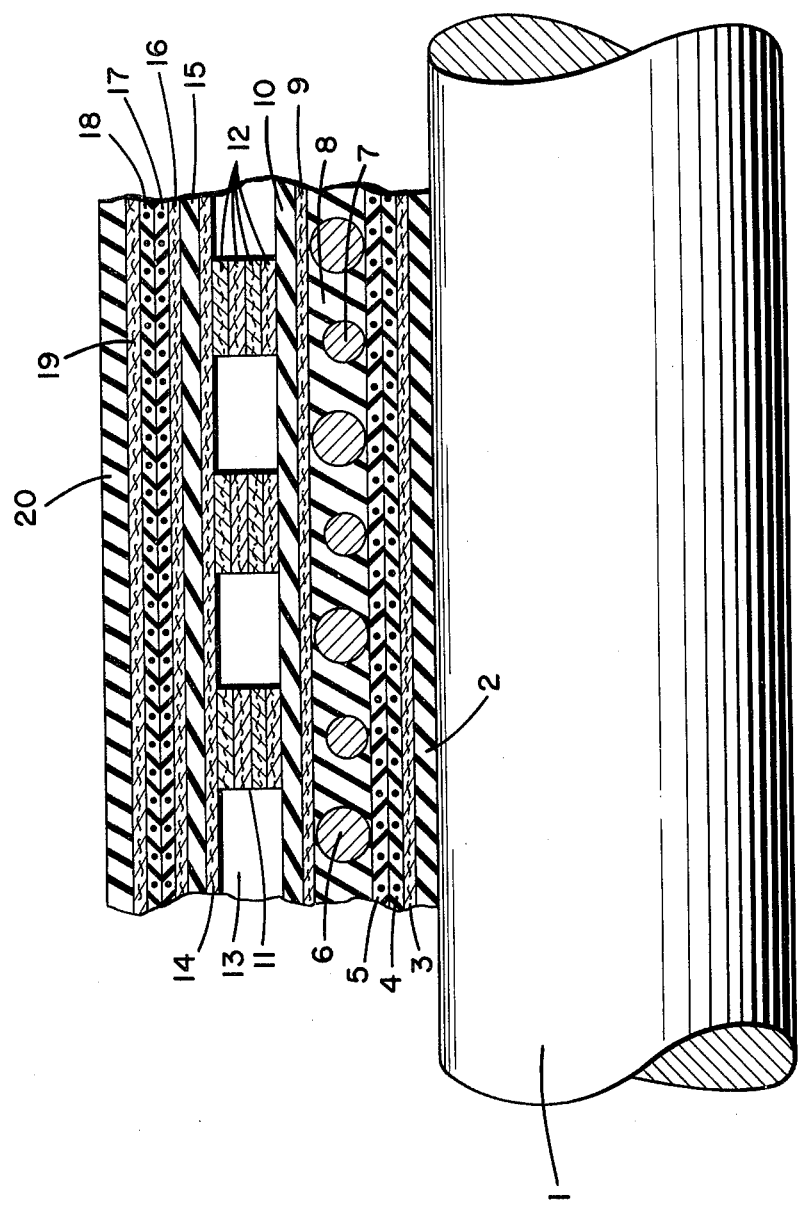

PROCESS FOR MANUFACTURING FLEXIBLE HOSES OF ELASTOMERIC MATERIAL HAVING A CAVITY WALL

The present invention concerns a process for manufacturing hoses of elastomeric material whose wall contains a reinforcing structure, embedded into it, and is provided with a hollow space.

Processes for manufacturing hoses provided with a hollow space in their wall, and consequently hoses having a hollow space in their wall, are already known.

In a known process for manufacturing hoses having a hollow space in their wall, the formation of said space is carried out by helically winding a small tube on a basic tubular layer, and then by covering the obtained unit with a tubular covering layer.

In another known process for manufacturing hoses having a hollow space in their wall, the formation of the latter is carried out by inserting the one into the other two hoses of different diameter and such that a space may be left between the outer surface of the inner hose and the inner surface of the outer hose, said space constituting the interspace.

The conventional processes for manufacturing hoses having a hollow space in their wall do not allow the formation of hollow spaces of constant volume and exact dimensions. In fact, in the known process according to which the hollow space is formed by windng up a small tube about a first tubular hose, the positioning of the former on the latter takes place with a deformation due to the uncontrolled ovalization of the section of said small tube.

Also the known process according to which the formation of the hollow space is obtained by inserting the one into the other two hoses of different diameter, the hollow space has not a constant volume and an exact dimension in consequence of the deformation of the outer tube, which is variable as a function of the distance from their own ends, due to the weight of the outer tube itself.

The present invention aims at providing a process for manufacturing flexible hoses having their walls reinforced with a reinforcing structure and provided with a hollow space of practically constant volume and of exact dimensions also when the configuration of the hose is varied.

Accordingly, the object of the present invention is a process for manufacturing reinforced hoses of elastomeric material having a hollow space in their wall, comprising the steps of:

building up about a rigid support a first tubular layer of elastomeric material containing a reinforcing structure;
positioning about said first tubular layer coming from the preceding step at least a helicoid of a structural shape of elastomeric material reinforced in such a way as to be practically indeformable to pressure stresses in the direction of its thickness;
building up a second continuous tubular layer about the helicoid of structural shape, said tubular layer being in contact with the outer surface of said structural shape;
filling the hollow space with incompressible material, inert to the effect of vulcanization;
curing the obtained unit in an autoclave under pressure;
removing in liquid state the inert material filling the hollow space.

The present invention will be better understood from the following detailed description given by way of non-limiting example and made with reference to the FIGURE of the attached sheet of drawing, which represents in section a length of hose produced according to the process, supported on a building mandrel.

In its most general embodiment, the process according to the present invention comprises the following steps:

a first tubular layer of elastomeric material, in which is embedded a reinforcing structure, is formed about a rigid mandrel;
at least a helicoid of a structural shape of elastomeric material, whose characteristic is that of being practically indeformable under pressure stresses exerted along the thickness of said structural shape, is positioned about said first tubular layer;
a second tubular layer of elastomeric material embedding a reinforcing structure is formed on the helicoid;
the hollow space is filled with an incompressible material, inert to the effects of vulcanization;
the obtained unit is cured in an autoclave under pressure;
the incompressible material, inert to the effects of vulcanization, is removed in liquid state from the hollow space.

The above described phases are carried out in the order in which they are listed if a liquid, as for instance water, is used as incompressible material, inert to the effects of vulcanization.

If the incompressible material, inert to the effects of vulcanization, is a solid material which liquefies at relatively low temperatures, said material is applied, in building up the hose, immediately after the application of the helicoid of structural shape of elastomeric material.

The description of a process is now made, in respect of a particular embodiment, for the case in which a solid material which liquefies at relatively low temperatures is used as incompressible material, inert to the effects of vulcanization.

A layer 2 of elastomeric material is formed about a rigid mandrel 1, made for instance of metal. Said layer is obtained by winding up the mandrel 1 with a tape of elastomeric material.

A layer 3 of rubberized square woven fabric is formed on the layer 2. The formation of the layer 3 of rubberized fabric is carried out by winding up about the layer 2 a tape of rubberized square woven fabric.

At least two layers 4 and 5 of rubberized cord fabric are formed on the layer 3. Said layers are formed by winding up tapes of rubberized cord fabric about the underlying layers. In particular, if the winding of the rubberized cord fabric forming the layer 4 has been effected clockwise, the winding of the rubberized cord fabric forming the layer 5 will be effected counter-clockwise, and vice versa.

Two helicoids of wire rod are positioned on layer 5.

In particular, use is made of a helicoid of a wire rod 6 of big diameter and a helicoid of a wire rod 7 of smaller diameter.

The space between the helicoids of wire rods 6 and 7 is filled with elastomeric material 8 in order to form a layer whose outer surface is tubular and smooth.

A layer 9, made of rubberized square woven fabric, is built up on the layer made of the elastomeric material 8. The formation of the layer 9 is effected by winding up a tape of square woven fabric.

A layer 10 of elastomeric material is built up on layer 9 by winding up a tape of elastomeric material.

At least a helicoid of a structural shape 11 of elastomeric material, reinforced in such a way that said structural shape is practically indeformable to compression stresses exerted in the direction of its thickness, is arranged on the layer 10 of elastomeric material.

For the structural shape 11 it is particularly convenient to use a structural shape formed by assembling a plurality of tapes of rubberized fabric 12 in such a number as to obtain the desired thickness.

The space 13 existing between the coils of the helicoid formed by the structural shape 11 is filled with a solid material, inert to the effects of vulcanization, which liquefies at relatively low temperatures. Spaces 13 may be filled with a winding of a solid material which liquefies at low temperature so as to fill the spaces between the coils of the helicoid of structural shape for a thickness equal to the thickness of the structural shape.

For the solid material, inert to the effects of vulcanization and able to liquefy at relatively low temperatures it is particularly convenient to use a mixture of paraffin and of an ethylene/vinyl acetate copolymer, as for instance one of those known in the trade under the name Alvax and produced by Du Pont.

A layer 14 of square woven fabric, obtained by winding up a tape of a fabric of this type, is formed on the helicoid of structural shape 11.

A layer 15 of elastomeric material, obtained by winding up a tape of this material, is formed on the layer 14.

A further layer 16 of square woven fabric, obtained by winding up a tape of this type, is formed on the layer 15.

At least two layers 17 and 18 of rubberized cord fabric are formed on the layer 16. Also these layers are formed by winding up tapes of rubberized cord fabric. In particular, if the winding of the tape of rubberized cord fabric forming layer 17 has been effected clockwise, the winding of the tape of rubberized cord fabric for forming layer 18 is effected anticlockwise and vice versa.

At least a layer 19 of rubberized square woven fabric, obtained by winding up a tape of this type, is formed on the layer 18.

Now a covering layer 20 of elastomeric material is applied on the layer 19.

The hose, built up as described above, and still supported on the rigid mandrel 1, is introduced in an autoclave with steam under pressure, and is cured.

After curing, the incompressible material, inert to the effects of vulcanization, which had been used in solid state to fill the spaces 13 between the coils of the helicoid 11, is removed in liquid state.

After this operation, the mandrel is extracted from the hose.

The preceding description indicates two alternative embodiments of the process according to the present invention. In both of said embodiments there is an important element. Said important element is a particularity of the phase of positioning the helicoid of structural shape 11 of elastomeric material, and consists in the pitch of the helicoid of structural shape.

The pitch of the helicoid of structural shape 11 must be a function of the bending stiffness of the assembly of layers 14 to 20, in the meaning that, according to the stiffness of said assembly, the value of the pitch of the helicoid must be such that the portions of the assembly of layers comprised between two adjacent coils do not suffer practically any deformation, namely have a practically nul deflection, whichever is the compression load in the portions of the assembly of layers 14 to 20 comprised between two adjacent coils, which can take place in them in consequence of the various possible bending deformations of the already cured hose during its use.

Although some preferred embodiments of the present invention have been described and illustrated, it is understood that it includes any other embodiment deriving from the above indicated inventive concept.

What is claimed is:

1. A process for manufacturing reinforced hoses of elastomeric material having a hollow space in their wall, comprising the steps of:
   building up about a rigid support a first continuous tubular layer of elastomeric material containing a reinforcing structure;
   positioning about said first tubular layer a helicoid with a hollow space existing between each adjacent coil, said helicoid being of a structural shape of elastomeric material reinforced in such a way as to be practically indeformable to pressure stresses in the direction of its thickness;
   building up a second continuous tubular layer about the helicoid of structural shape, said tubular layer being in contact with the outer surface of said structural shape;
   filling the hollow space between each adjacent coil of said helicoid with incompressible material, inert to the effects of vulcanization;
   curing the obtained unit in an autoclave under pressure;
   removing in liquid state the inert material filling the hollow space.

2. A process as in claim 1, wherein the step of filling the hollow space with a material inert to the effects of vulcanization consists in positioning about the helicoid as the next intermediate layer a winding of a solid material which liquefies at low temperature so as to fill the spaces between the coils of the helicoid of structural shape for a thickness equal to the thickness of said structural shape.

3. A process as in claim 1, wherein the step of filling the hollow space of the hose with a material inert to the effects of vulcanization consists in injecting a liquid in said hollow space already formed, before the curing step.

4. A process as in claim 1, wherein in the step of positioning at least a helicoid of a structural shape about the first tubular layer, said helicoid is disposed at a pitch whose value does not exceed a pre-established value, said pre-established value being a function of the stiffness of the assembly of overlying layers in direct contact with the helicoid and being determined in such a way that the deflection of said assembly of layers comprised between two adjacent coils of the helicoid of structural shape is nul for any compression load in the portions of the assembly of overlying layers comprised between two adjacent coils which can take place in them in consequence of any possible bending deformation of the hose in use.

* * * * *